United States Patent [19]

Poppendiek et al.

[11] Patent Number: 5,185,122
[45] Date of Patent: Feb. 9, 1993

[54] GAMMA RAY FLUX MEASUREMENT SYSTEM

[75] Inventors: Heinz F. Poppendiek, La Jolla, Calif.; John A. Lundin, Vienna, Va.

[73] Assignee: Geoscience Ltd., Solana Beach, Calif.

[21] Appl. No.: 629,687

[22] Filed: Dec. 18, 1990

[51] Int. Cl.$^5$ ............................................. G21F 5/06
[52] U.S. Cl. .................... 376/272; 376/245; 376/247; 376/257; 376/299; 376/450; 250/336.1; 374/1; 374/179
[58] Field of Search ............... 376/245, 247, 272, 299, 376/450, 257; 976/DIG. 207, DIG. 231, DIG. 235, DIG. 236, DIG. 238, DIG. 239, DIG. 232, DIG. 233, DIG. 234; 250/336.1; 374/1, 179

[56] References Cited

U.S. PATENT DOCUMENTS

| | | | |
|---|---|---|---|
| 3,145,300 | 8/1964 | Coss et al. | 250/336.1 |
| 4,393,025 | 7/1983 | Leyse | 376/247 |
| 4,411,859 | 10/1983 | Smith et al. | 376/247 |
| 4,425,297 | 1/1984 | Rolstad et al. | 376/247 |
| 4,439,396 | 3/1984 | Rolstad | 376/247 |
| 4,440,716 | 4/1984 | Smith | 376/247 |
| 4,614,635 | 9/1986 | Terhune | 376/154 |
| 4,620,800 | 11/1986 | Anno | 374/132 |
| 4,634,570 | 1/1987 | Jacquot et al. | 376/247 |
| 4,637,913 | 1/1987 | Jacquot et al. | 376/247 |
| 4,751,040 | 6/1988 | Poppendiek | 376/272 |

FOREIGN PATENT DOCUMENTS 3144984 5/1983 Fed. Rep. of Germany ...... 376/247

OTHER PUBLICATIONS

Leyse, R. H. and R. D. Smith, "Gamma Thermometer Developments for Light Water Reactors", IEEE meeting Oct. 1978, pp. 1-17.

Primary Examiner—Donald P. Walsh
Assistant Examiner—Chrisman D. Carroll
Attorney, Agent, or Firm—Antonio M. Fernandez

[57] ABSTRACT

Gamma radiation leaving the surface of a radioactive materials storage vessel is measured and monitored using a plurality of gamma ray absorbing calorimeters. The gamma ray energy absorbed is converted into heat and such heat is measured or indicated for the purpose of monitoring expected radioactive decay processes of the stored radioactive materials. Material leakage or removal from storage is detected and defined by deviations from the normal expected decay in gamma radiation. Such deviation or lack of deviation, as the case may be, provide the desired accountability of the radioactive materials. Since there can be several bands of gamma ray radiation, both flux and its energy level may be determined by using different gamma absorbing materials in the calorimeters selected for the known possible energy levels of the decaying radioactive material. From 'n' simultaneous heat balance equations one for each calorimeter having a different absorbing material, it is possible to measure the energy level of the gamma radiation flux at each calorimeter.

6 Claims, 1 Drawing Sheet

GAMMA RAY FLUX MEASUREMENT SYSTEM

BACKGROUND OF THE INVENTION

The invention relates to a calorimetric gamma ray radiation flux measurement system and is particularly useful for monitoring and for administrative control of sealed radioactive material vessels at storage sites, and in general to a radioactive material accountability system.

The present invention is an improvement in a radioactive material accountability system of the character described and claimed in U.S. Pat. No. 4,751,040 which operates on the principle of monitoring the heat flow from confined radioactive materials by sensing the integrated heat release leaving the vessel. The release of heat is primarily due to the absorption of radiation particles by the spent fuel and the wall of the storage vessel. The heat produced by radioactive materials diminishes at a known rate related to the half life of the radioactive materials.

Gamma ray radiation is also transmitted through the vessel materials. Therefore, in order to properly survey a storage vessel containing spent fuel or other radioactive material, it is necessary to establish not only the sensible heat release from the vessel, but also the flux and energy levels of the gamma radiation escaping from the vessel to obtain a better measurement of the total energy emitted. Any deviation from the anticipated energy release would indicate a change in the amount of radioactive material stored in the vessel, i.e., a negative deviation would indicate a loss of radioactive material.

OBJECTS AND SUMMARY OF THE INVENTION

An object of the present invention is to improve the integrity of long-term radioactive material accountability systems by measuring the gamma ray radiation flux that penetrates and flows through the storage vessel.

A further object of the present invention is to provide this improvement by positioning small gamma ray absorbing slabs with surrounding calorimeters around the storage vessel for monitoring gamma radiation flux from the vessel.

In accordance with the preferred mode for practicing the present invention, a plurality of gamma ray absorption slabs are provided around the storage vessel for converting gamma radiation absorbed into heat, and the heat so developed by each slab is monitored by a calorimeter. An in situ calibration system is provided for the calorimeter.

A further object is to provide a system for measuring not only gamma flux but its energy level using different gamma absorbing materials selected for the known possible energy levels of the stored radioactive materials in separate calorimeters that contain a thermal heat flux sensor system. These calorimeters are grouped close together, and several such groups are positioned in zones around the storage container. Knowing the absorption coefficients of two absorption materials, one would know from the heat flux measurement which of two gamma ray energy levels are operative, or if both are operative, which is the dominant one. From two simultaneous heat balance equations in two unknowns $\phi_{01}$ and $\phi_{02}$ (the initial gamma flux $\phi_0$ operative for the energy levels of two known absorption materials designated by the subscripts 1 and 2), it is possible to determine the gamma radiation flux at two energy level gamma radiation bands using two calorimeters and two different absorbing materials. This system may be expanded to the general case of 'n' energy level gamma radiation bands with 'n' calorimeters and 'n' absorbing materials by solving 'n' simultaneous equations in 'n' unknown.

DESCRIPTION OF PREFERRED EMBODIMENTS

Figure 1:
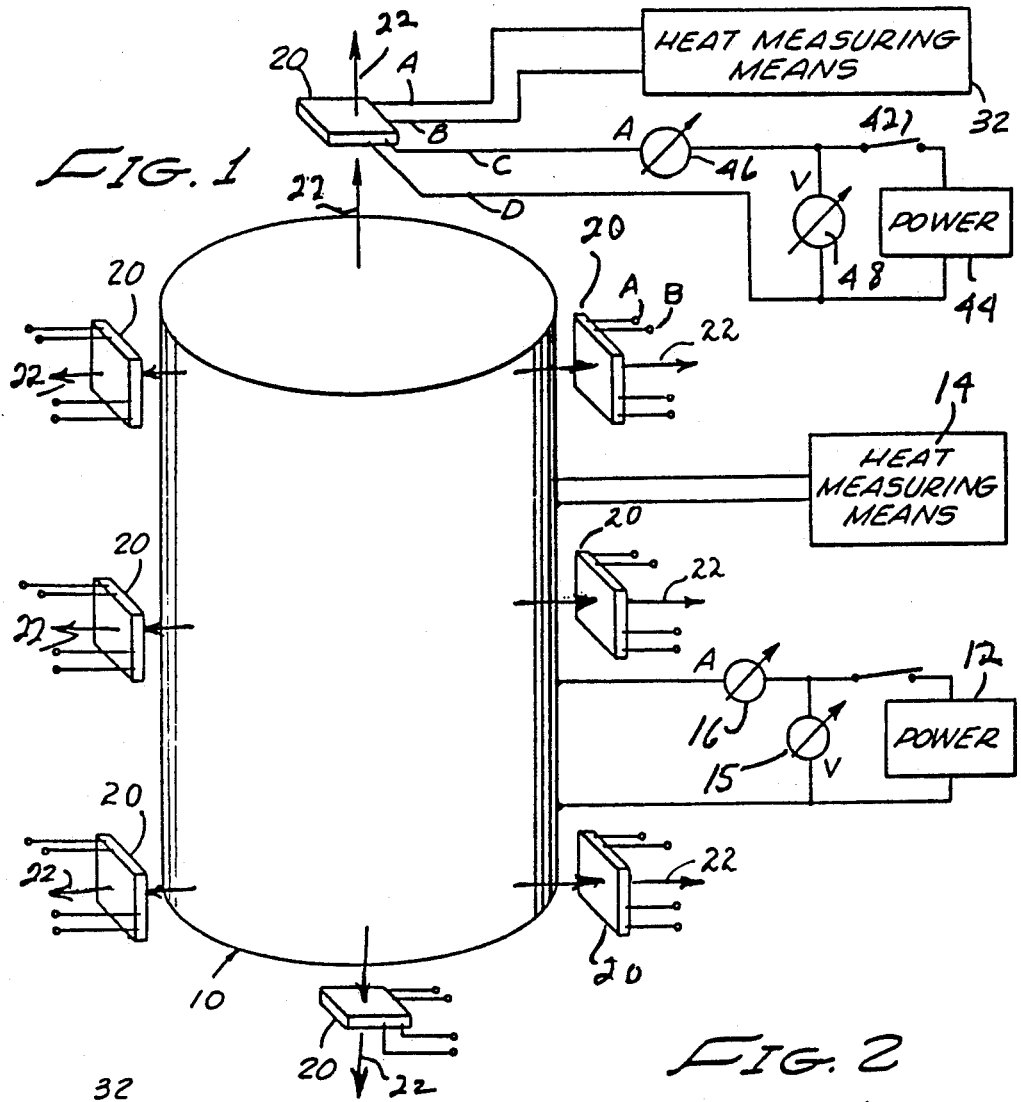
FIG. 1 illustrates a system embodying features of the present invention.

Referring to FIG. 1, a vessel 10, to which an electric power supply 12 and heat measuring means 14 are connected, is used as a radioactive material storage vessel which is monitored as described in the aforesaid patent.

As described in that patent, the heat measuring means monitors the heat being released from the radioactive storage vessel 10. Deviations from the anticipated heat release for a given period of elapsed time are indicative of radioactive material loss through leakage or removal. In order to detect such deviations, a heat flux sensor envelope is mounted on or within the walls of the vessel 10 and its electrical output is applied to the heat measuring means 14, which may be calibrated using auxiliary heat supplied with power from the source 12 in a conventional manner using an ammeter 16 and voltmeter 15.

In accordance with a preferred embodiment of the present invention, a plurality of calorimeters 20 (structured as shown in a cross-sectional view in FIG. 2) are strategically positioned around the vessel 10, each with gamma ray absorbing material, to intercept gamma radiation therefrom as indicated by arrows 22. These calorimeters are flat in geometry for containing a slab 26 shown in FIG. 2 of known volume and of known gamma ray absorbing material, such as boron, aluminum, steel, or the like, within a casing 28.

Figure 2:
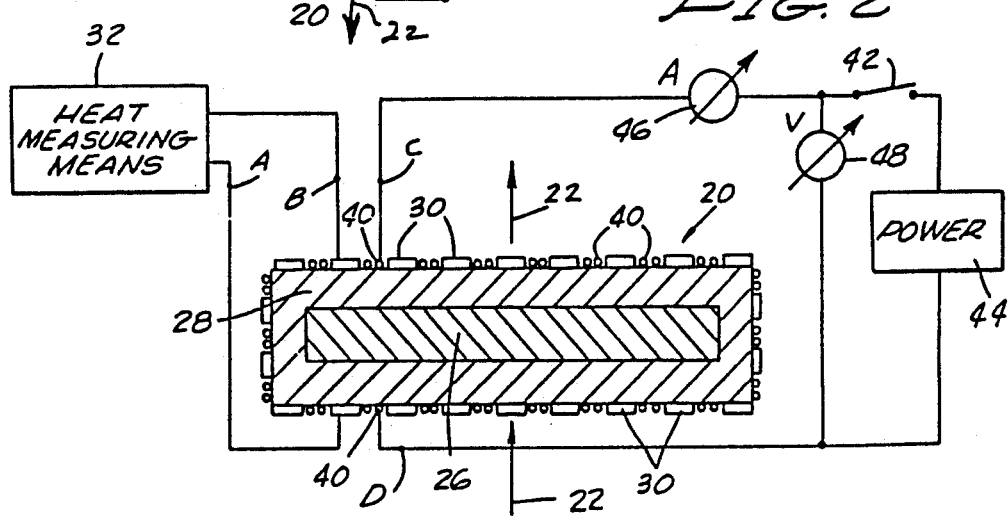
FIG. 2 is a sectional view through one of the gamma ray calorimeters shown in FIG. 1.

Referring to FIG. 2, the captured gamma radiation in the slab 26 is translated into heat flow that is directly measured by serially connected thermopiles 30 whose output is indicated or measured on heat measuring means 32, preferably provided in the form of an electrical output meter. Such measured heat release rates can then be related uniquely to the gamma ray fluxes being present on the basis of the known gamma ray absorption characteristics for the particular absorbing materials.

The heat measuring system for each slab 26 of gamma ray absorbing material may be calibrated periodically using a heater winding 40 by closing a switch 42 and measuring the power delivered from a power source 44 to the heater winding 40 using an ammeter 46 and a voltmeter 48. The heater winding can be located either on the surface of the casing 28 or under the heat flux sensing thermopiles 30. The measured electrical input power in such calibration is compared with the corresponding effect that the electrically produced heat has on the heat measuring means 32.

A separate heat measuring means 32 may be provided for each individual gamma ray sensor 20. Alternatively, the electrical output terminals of all sensors may be multiplexed to a single heat measuring means 32 or, if desired, the electrical output terminals of all sensors may be serially connected to a single heat measuring means 32.

The gamma radiation penetrating the walls of a radioactive material vessel can vary with position around the container. In addition, there can be several energy levels or bands in which these radiations fall. It is therefore of interest to measure not only the gamma flux but also its energy level when making a survey of such storage containers. One then starts with an unknown gamma radiation flux and an unknown gamma energy level. The way in which one would determine the two unknowns (flux and its energy level) is as follows:

Knowing the possible energy levels of the decaying isotopes in the stored radioactive materials (say levels 1 and 2), one chooses two different gamma absorbing materials for such radiations (say materials A and B). These absorbing materials would be inserted into two small calorimeters denoted as calorimeter A and calorimeter B, respectively, that contain a thermal heat flux sensor system and an in situ calibration heater, as described in U.S. Pat. No. 4,751,040. The two calorimeters are positioned near each other, and other paired calorimeters are positioned in zones around the storage vessel 10 wherever flux measurements are to be made. After the two measurements are made, one calorimeter may give a relatively high signal in contrast to the other. For example, the output signal of calorimeter A containing absorption sample A might have a much greater millivolt output than the output signals for calorimeter B with its absorbing material B. Since the absorption coefficient energy level spectrum for materials A and B are known, one would known which of the two gamma ray energy levels were operative or, if there were two levels, which one was the dominant one.

For the purpose of this discussion, a simplified exponential flux relation is used to represent the complicated attenuation processes in an absorbing slab, namely:

$$\phi = \phi_o e^{-\Sigma x} \tag{1}$$

where $\phi_o$ is the initial gamma flux, $\Sigma$ is the total gamma absorption cross-section or coefficient, and x is the distance into slab which is known from the geometry of the calorimeter 20 and its position relative to the storage vessel 10. The volumetric heat source for gamma radiation of energy E MEV is thus:

$$W(x) = -\frac{d\phi}{dx} E = \Sigma E \phi_o e^{-\Sigma x} \tag{2}$$

A mean volumetric heat source for this slab $\overline{W}$ (obtained by integration) is:

$$\overline{W} = \frac{E\phi_0}{L} (1 - e^{-\Sigma L}) \tag{3}$$

where L is the absorption slab thickness. The heat release in the complete slab, $q_\gamma$, is:

$$q_\gamma = \overline{W} La = aE\phi_o(1 - e^{-\Sigma L}) \tag{4}$$

where a is the cross-sectional area of the slab. A heat balance on calorimeter A is, $$q_{\gamma A} = C_A(MV_A) = aE_1\phi_{01}(1 - e^{-\Sigma_{A1}L}) + aE_2\phi_{02}(1 - e^{-\Sigma_{A2}L}) \tag{5}$$

where $C_A$ is a known calorimeter constant for calorimeter A, $(MV_A)$ is a millivolt output signal of calorimeter A, subscripts 1 and 2 refer to energy levels 1 and 2, and subscript A refers to a calorimeter with absorbing material A. A heat balance on calorimeter B is:

$$q_{\gamma B} = C_B(MV_B) = aE_1\phi_{01}(1 - e^{-\Sigma_{B1}L}) + aE_2\phi_{02}(1 - e^{-\Sigma_{B2}L}) \tag{6}$$

where $C_B$ is a known calorimeter constant for calorimeter B, $(MV_B)$ is a millivolt output signal for calorimeter B and subscript B refers to a calorimeter with absorbing material B. Equations (5) and (6) then consist of two simultaneous equations in two unknowns $\phi_{o1}$ and $\phi_{o2}$ which are solvable.

Similarly if one wanted to consider 'n' energy level gamma radiation bands with 'n' calorimeters and 'n' different known absorbing materials, one would write 'n' equations in 'n' unknowns (the general case). The 'n' gamma radiation calorimeters would be flat in shape and each just large enough to receive one of the 'n' absorption slabs. Such 'n' calorimeters would be grouped, and a plurality of groups would be located in various zones around the storage vessels and oriented so that the flat surfaces would be perpendicular to the gamma radiation. In this way, a more ideal representation of gamma energy absorption in a flat plate positioned in the path of the gamma rays could be achieved.

It will be appreciated that gamma ray systems using calorimeters 20 as described and illustrated may, if desired, be used independently of the vessel heat flow monitoring system of the prior U.S. Pat. No. 4,751,040 that incorporates the heat measuring means 14, although it may be preferred to use both systems simultaneously for closer observation of radioactive decay conditions.

What is claimed is:

1. In a system for storing radioactive material in a storage vessel, a method for monitoring radiation absorbed by said vessel and gamma radiation leaving the surface of said vessel comprising the steps of providing said vessel for storage of radioactive material with a heat flux measuring system, said heat flux measuring system producing an output representative of the quantity of heat flow throughout said vessel due to radiation absorbed by said radiation absorbing material of said vessel, spacing slabs of gamma radiation absorbing material away from said storage vessel for absorbing gamma radiation not absorbed by said vessel and producing gamma radiation heat therefrom, measuring said gamma radiation heat and using said gamma radiation heat measurement for comparison, together with said output representative of said heat flow throughout said vessel, with expected heat quantity from anticipated energy release due to radiation from said stored radioactive material or comparison with previous measurements of heat flow throughout said vessel and of said gamma radiation heat produced in said slabs, thereby determining deviations from the anticipated heat release indicative of radioactive material loss through leakage or removal.

2. A method for monitoring gamma radiation as set forth in claim 1 in which measuring said heat is carried out by disposing a set of heat sensing means circumferentially around each of said gamma radiation absorbing material slabs, one separate heat sensing means around each slab, and integrating the heat measurements of said set of heat sensing means.

3. A method for monitoring gamma radiation as set forth in claim 2 including the step of calibration by disposing separate heat producing means circumferentially about each of said gamma radiation absorbing material slabs for producing a source of calibration heat and measuring said calibration heat.

4. A method as set forth in claim 1 in which said slabs of gamma radiation absorbing material are spaced from each other around said storage vessel, and measuring said heat is carried out by mounting separate thermoplies on each of said slabs for measuring the heat produced by gamma radiation absorbed in each slab.

5. A method for monitoring gamma radiation by determining both flux and energy level related to the presence of radioactive materials in a radioactive storage system, the steps of using different n slabs of different gamma radiation absorbing materials of known absorption coefficient energy level spectrum, where n is an integer, for converting gamma radiation from said storage system into heat, separately measuring said heat from said different gamma absorbing materials, and from n simultaneous heat balance equations for said n different gamma absorbing materials, determining the energy level of gamma radiation flux at each of several bands of radiation, one band for each different radiation absorbing material.

6. A method as defined in claim 5 including the step of disposing separate heat producing means circumferentially about said slabs of gamma radiation absorbing materials for producing a separate source of calibration heat for each slab and measuring said calibration heat for each slab of gamma radiation absorbing material.

* * * * *